United States Patent
Huotari et al.

(10) Patent No.: US 7,707,348 B2
(45) Date of Patent: Apr. 27, 2010

(54) MULTI-USE USB HOST TO ETHERNET ADAPTER

(75) Inventors: Allen J. Huotari, Garden Grove, CA (US); Kendra S. Harrington, Irvine, CA (US); Matthew B. McRae, Laguna Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 11/181,194

(22) Filed: Jul. 13, 2005

(65) Prior Publication Data

US 2007/0016714 A1    Jan. 18, 2007

(51) Int. Cl.
G06F 13/20    (2006.01)

(52) U.S. Cl. .................. 710/313; 710/305; 710/306

(58) Field of Classification Search ......... 710/305–306, 710/313, 100; 709/250
See application file for complete search history.

(56) References Cited

U.S. PATENT DOCUMENTS

| | | |
|---|---|---|
| 6,697,372 B1 | 2/2004 | McAlear |
| 6,708,247 B1 | 3/2004 | Barret et al. |
| 2003/0043771 A1 | 3/2003 | Mizutani et al. |
| 2003/0167347 A1* | 9/2003 | Combs et al. ............... 709/250 |
| 2004/0090984 A1 | 5/2004 | Saint-Hilaire et al. |
| 2004/0162929 A1* | 8/2004 | Zolnowsky ................ 710/313 |
| 2004/0246909 A1 | 12/2004 | Ahn |
| 2006/0123166 A1* | 6/2006 | Toebes et al. ............... 710/106 |
| 2006/0168388 A1* | 7/2006 | von Tetzchner ............ 710/305 |

OTHER PUBLICATIONS

CommsDesign, "USB, Bluetooth Unite for Wireless Printing," http://www.commsdesign.com/showArticle:jhtml?articleID=16502119, 3 pages (last visited Oct. 13, 2005).
D-Link, "AirPlus® G, 802.11g/2.4GHz Wireless, Print Server," 2 pages.
D-Link, "D-Link DP-G310, AirPlug G Wireless USB Sever", Manual, excerpt (pp. 30-39), 11 pages.
Intel, "Wireless USB, The First High-Speed Personal Wireless Interconnect," White Paper, 2004, 8 pages.
Linksys, A Division of Cisco Systems, Inc., Network Storage Link for USB 2.0 Disk Drives, http:/www.linksys.com/products/product.asp?grid=35&scid=43&pri . . . , 1 page, (last visited May 11, 2005).
"RTUSB-32—Real-Time Embedded USB Host Protocol Stack," http://www.on-time.com/trusb.htm, 2 pages, (last visited Jun. 23, 2005).
TransDimension, "USBLink Host," http://www.transdimension.com/products/software/usb/suite/host/, 2 pages, (last visited Jun. 22, 2005).

(Continued)

*Primary Examiner*—Paul R Myers
*Assistant Examiner*—Kim T Huynh
(74) *Attorney, Agent, or Firm*—Haynes & Boone, LLP.

(57) ABSTRACT

A multi-use adapter configured to provide network connectivity for a serial bus client is provided. The adapter includes: a serial interface for coupling with the serial bus client; a network interface for interfacing the adapter with a network; and host control logic configured to interface a plurality of types of serial bus clients with a utilizing device over the network. The host control logic may be configured to detect a USB client coupled to the USB interface, to determine a corresponding driver for the detected USB client, and to retrieve the corresponding driver via the network interface.

24 Claims, 4 Drawing Sheets

OTHER PUBLICATIONS

TransDimension, "USBLink Peripheral," http://www.transdimension.com/products/software/usb/suite/host/, 2 pages, (last visited Jun. 22, 2005).

TransDimension, "USBLink On-The-Go (OTG)," http://www.transdimension.com/products/software/usb/suite/host/, 2 pages, (last visited Jun. 22, 2005).

USBLink Host, "A Complete USB Host Software Solution for Embedded Systems," www.softconnex.com, 2 pages.

"USB Embedded Host Controller Design," EmbeddedSystems Europe, www.embedded.com/europe, Jan./Feb. 2004, 3 pages.

* cited by examiner

MULTI-USE USB HOST TO ETHERNET ADAPTER

BACKGROUND

Universal Serial Bus (USB) is a serial communications architecture that is typically used to provide a personal computer (PC) with the ability to interconnect a variety of USB-enabled devices using a simple four wire cable. These USB devices are categorized into various device classes, including printer, display, communication, audio, mass storage, digital camera, audio player, and human interface. These USB devices are configured as USB clients which must be connected to a USB host in order to utilize the USB interface. The USB host has conventionally been a PC including a USB interface (e.g., a USB hub) and device driver software for various types of USB devices that might be connected.

More recently, network adapters have been provided with USB interfaces. These USB network adapters adapt one network topology to USB in order to allow a PC to connect to the network via the PC's USB interface, rather than via a network adapter or network interface card (NIC) directly coupled to the system's PCI bus. Two common USB network adapters are USB-to-Ethernet client adapters, which allow a USB host (e.g., a PC) to connect to an Ethernet device (e.g., a router), and USB-to-wireless client adapters, which allow a USB host (e.g., a PC) to connect to a wireless device (e.g., an IEEE 802.11 wireless access point).

In addition, USB host systems have been developed for embedded systems. However, these embedded USB host systems have been single-use type systems, such as print servers and set-top boxes. Thus, the software provided on the embedded USB host system is customized for a particular product or a particular class of products, thus reducing the complexity of the system.

However, these prior art system do not provide a configurable mechanism for connecting a USB client device to a network without the use of a PC serving as the USB host.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

Figure 1:
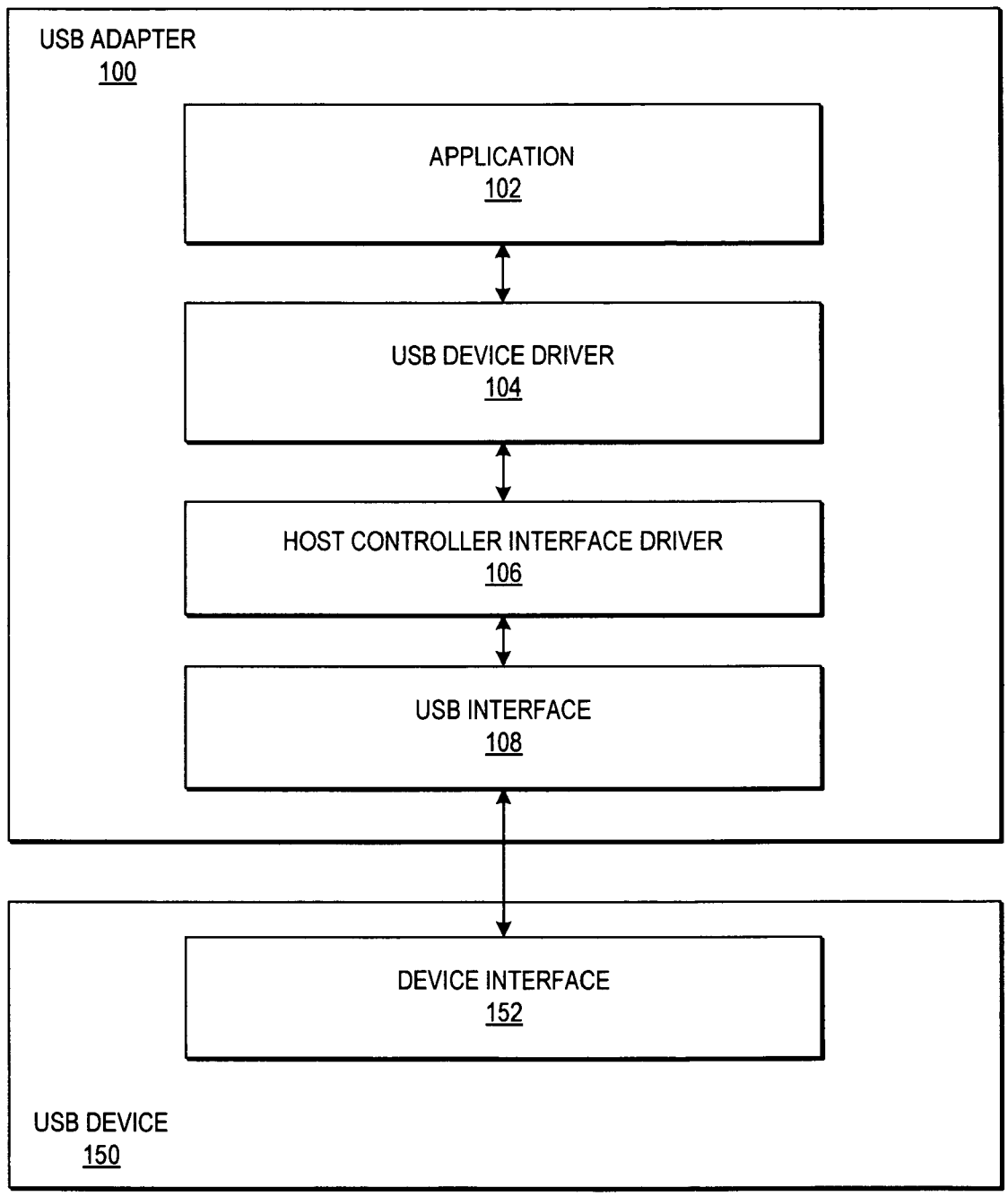
FIG. 1 is a block diagram of the architecture of an exemplary multi-use USB adapter and USB client device, in accordance with embodiments of the present invention.

FIG. 1 is a block diagram of the architecture of an exemplary multi-use USB adapter 100 and USB client device 150. The USB adapter 100 includes an application layer 102, which may comprise a software program which is operable to interact with the client device 150 using the USB device driver 104. The USB adapter 100 may be provided with device drivers for each device or class of devices that the USB adapter 100 is designed to support. The host controller interface driver 106 interfaces with the USB interface hardware 108. The USB interface hardware 108 provides the physical port or ports for connecting the device interface 152 of the USB device 150 to the USB adapter 100.

Figure 2:
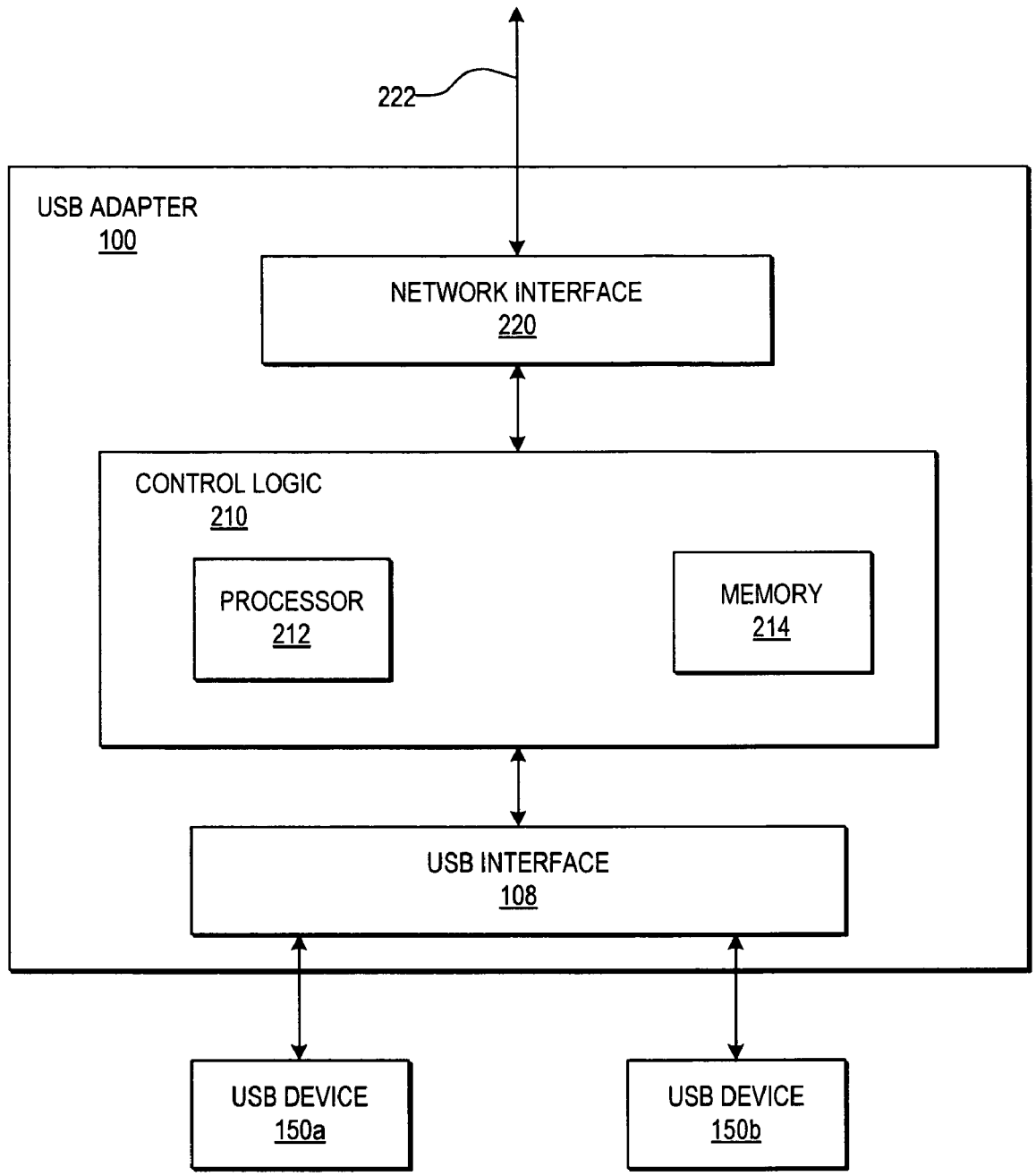
FIG. 2 is a block diagram of the USB adapter, in accordance with embodiments of the present invention.

FIG. 2 is a block diagram of the USB adapter 100. The USB adapter 100 comprises control logic 210, which implements the application layer 102, the USB device driver 104, and host controller interface driver 106, described above with respect to FIG. 1. These components are executed by the control logic 210 using a processor 212 and a memory 214. The USB adapter 100 also comprises a USB interface 108, which may comprise one or more USB ports for connection with one or more USB devices 150a-150b. The USB adapter 100 further comprises a network interface 220 for providing network connectivity. The network interface 220 may comprise, e.g., an Ethernet port such as an RJ-45 LAN port, for connection with an Ethernet cable 222. Alternatively, the network interface 220 may comprise a wireless interface, such as an IEEE 802.11 ("WiFi") interface for connection with a wireless access point. The USB host provided by the USB adapter 100 and the USB client device 150 may operate in accordance with the specifications described in Universal Serial Bus Specification Revision 2.0, Apr. 27, 2000, the disclosure of which is incorporated herein in its entirety.

Figure 3:
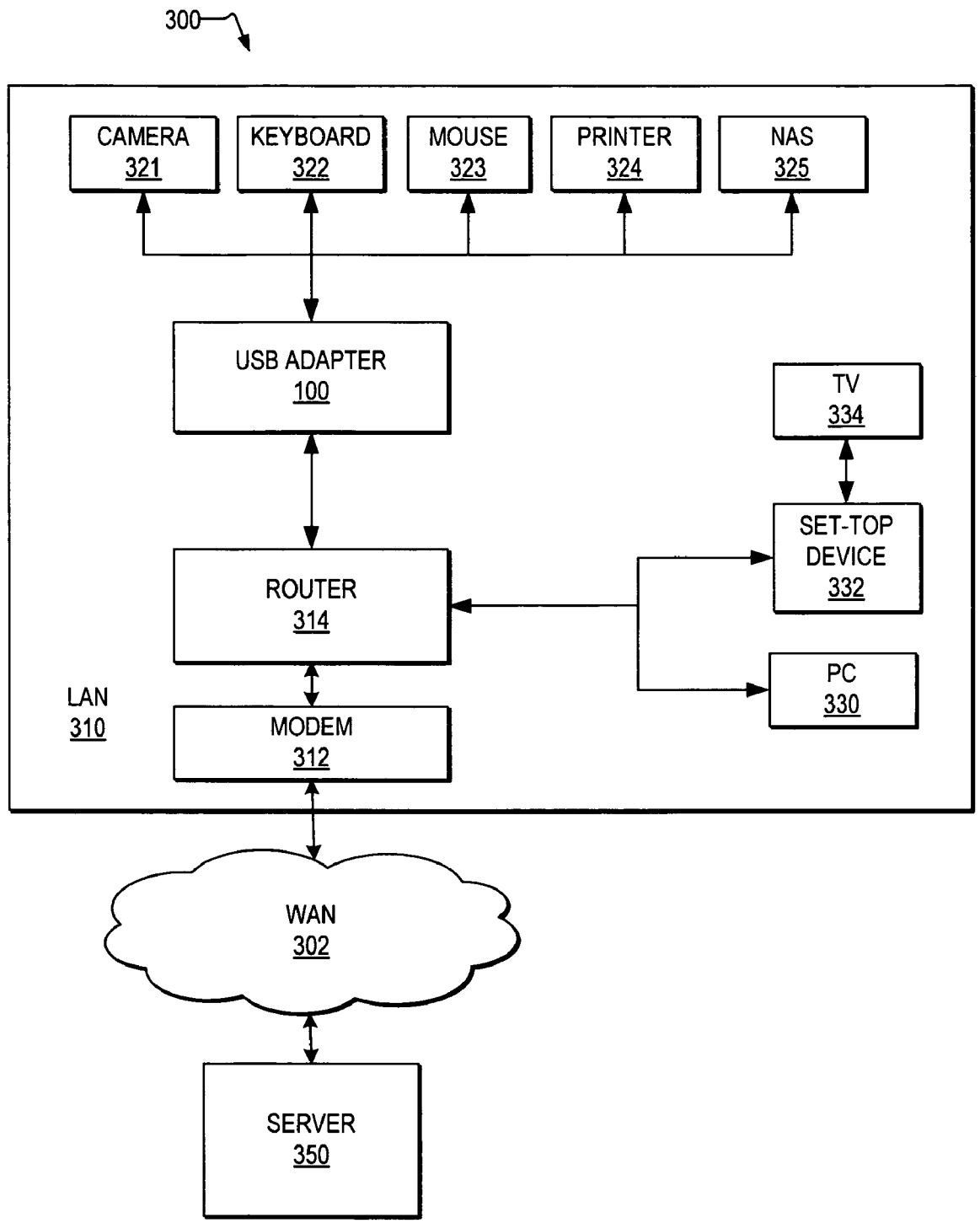
FIG. 3 is a block diagram of an exemplary implementation of the USB adapter in a data communications network, in accordance with embodiments of the present invention.

FIG. 3 is a block diagram of an exemplary implementation of the USB adapter 100 in a data communications network 300. In the illustrated embodiment, the data communications network 300 comprises a local area network (LAN) 310 coupled to a wide-area network (WAN) 302, such as, e.g., the Internet. The LAN 310 includes a router (or switch) 314 coupled to a modem 312 that provides an interface to the WAN 302. The router 314 and the modem 312 may be implemented as separate devices or as a single unit, such as a gateway network device.

The router 314 may be provided with one or more ports for connection with one or more devices in the LAN 310. These devices may include, e.g., a personal computer (PC) 330 and a set-top device 332, which is a device that connects to an entertainment device (e.g., a television 334) and some external source of signal, and turns the signal into content then displayed by the entertainment device. The signal source might be a satellite dish, a cable line, or another device on the LAN 310.

In accordance with embodiments of the present invention, the multi-use USB adapter 100 may be used to provide connectivity between a USB device and a network without the use of a separate PC serving as the USB host. Unlike USB-to-Ethernet print server devices, which are single-use devices used to operate as USB hosts for the sole purpose of enabling a USB printer to be connected to a network, the USB adapter 100 is configurable to interface with a plurality of different USB devices or classes of USB devices. In order to accomplish this, the memory 214 in the USB adapter 100 may store a plurality of USB device drivers. In some embodiments, if the memory 214 does not include the device driver corresponding to a USB device connected to the USB adapter, the control logic 210 is configured to retrieve the corresponding device driver from a remote location on the network.

Figure 4:
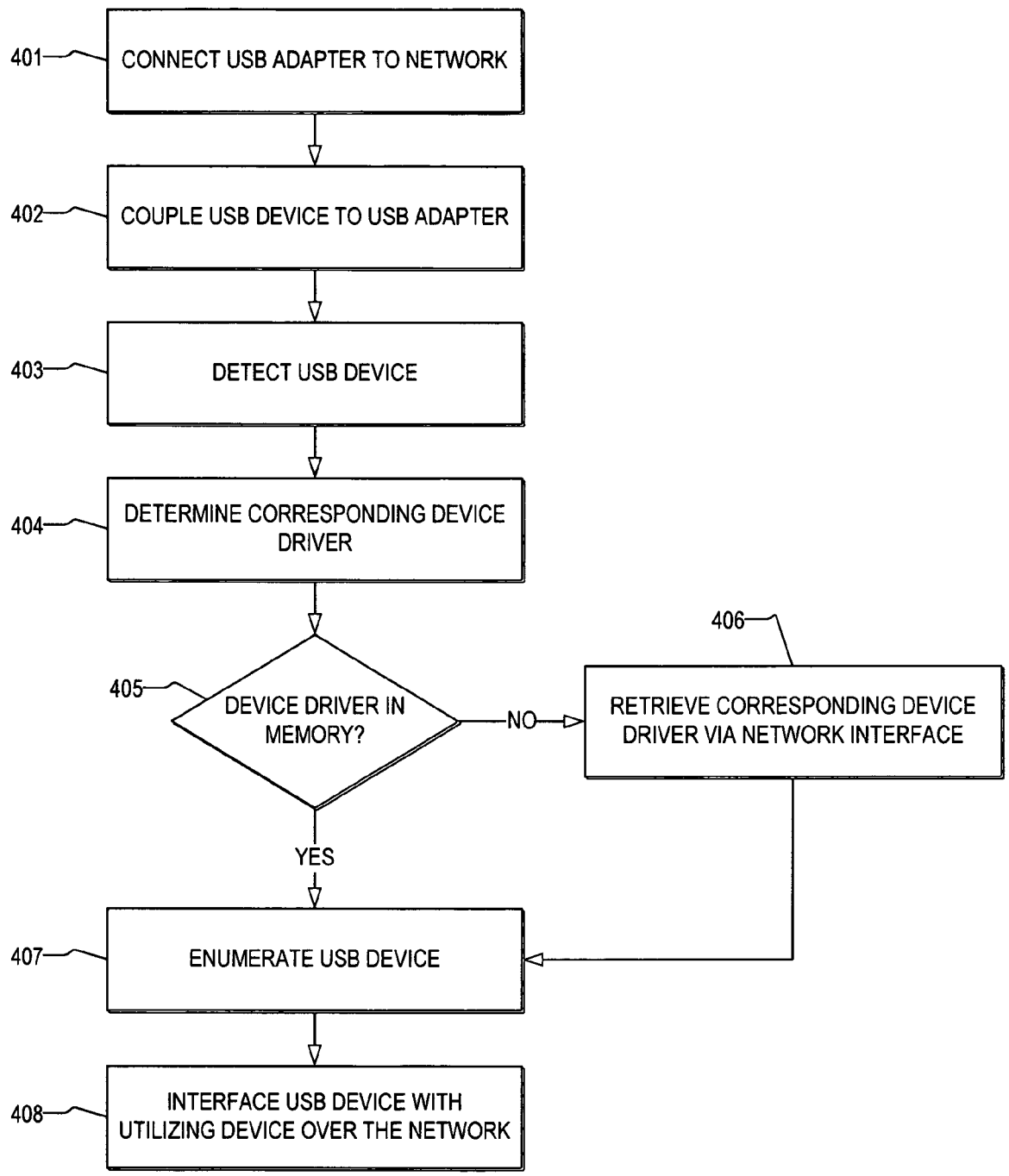
FIG. 4 is a flowchart showing the operation of the multi-use USB adapter, in accordance with embodiments of the present invention.

FIG. 4 is a flowchart showing the operation of the multi-use USB adapter 100, in accordance with embodiments of the present invention. In step 401, the USB adapter 100 is connected to the network. This can be accomplished, e.g., by inserting one end of an RJ-45 Ethernet cable into the network interface 220 and inserting an opposing end of the Ethernet cable into an RJ-45 port in the router 314. Alternatively, when the network interface 220 comprises a wireless network interface, the USB adapter 100 can be connected to the network by establishing a wireless link between the USB adapter 100 and a wireless access point (e.g., provided by a WiFi router).

In step 402, the USB device 150 is coupled to the USB adapter 100 by connecting the device 150 with the USB adapter 100 using a USB cable. It is to be understood that the sequence in which the steps are illustrated in FIG. 4 and described herein may be modified, as would be understood by one of ordinary skill in the art.

In step 403, the control logic 210 detects the presence of the recently-added USB device 150 on the USB bus. In step 404, the control logic 210 determines the appropriate USB device driver to use with the newly-added USB device 150. If in step 405 the control logic 210 locates the corresponding device driver in the memory 214, the USB device 150 will be enumerated in step 407 and a session is started.

If in step 405 the control logic 210 does not locate the corresponding device driver in the memory 214, the control logic 210 in step 406 will retrieve the corresponding device driver via the network interface 220. In the illustrated embodiment, a server 350 including a plurality of device drivers is provided on the WAN 302. The control logic 210 can be programmed with the location of the server 350 to enable the USB adapter 100 to download the corresponding device driver from the server 350. This programming may occur either before or after delivery to the end user. Once the device driver is retrieved, the device driver is loaded into memory and used to enumerate the USB device 150 in step 407.

Finally, in step 408, the USB adapter 100 interfaces the USB device 150 with a utilizing device (e.g., PC 330) over the network (e.g., LAN 310). The utilizing device can be any type of computing device capable of utilizing the USB device coupled to the USB adapter. The utilizing device can be, e.g., a computer, a set top device, a personal digital assistant, a camera, a video telephone, or a media adapter. Unlike conventional USB adapter systems, the USB adapter 100 serves as the USB host for the session with the USB device 150. Therefore, a utilizing device need not have the USB device drivers for the USB device 150. Instead, the utilizing device may have software configured to interface with the application 102 in the USB adapter 100 to interact with the USB device 150. This communication between the USB device 150 and the utilizing device can occur using, e.g., Internet Protocol (IP) over Ethernet.

The USB device 150 can be automatically configured to the network via DHCP. The USB adapter 100 may include TCP/IP software configured to request an IP address from the DHCP server after the USB device 150 has been enumerated. Alternatively, a utility application may be used for manual network configuration.

In accordance with another embodiment of the present invention, the USB adapter 100 may be customized to include the device drivers for a particular intended usage prior to delivery to the end user. This may be useful for a manufacturer that allows customers to request the type of USB adapter 100 desired. For example, a customer may use a browser application to log into the manufacturer's web site to choose from a plurality of configurations for the USB adapter 100. These configuration may be class-specific, e.g., for use with one or more of the following classes of USB devices: printer, display, communication, audio, mass storage, digital camera, audio player, and human interface. Alternatively, this configuration may be device-specific, e.g., for use with a particular brand or model of digital camera. Once the end user has selected a configuration, the appropriate USB device drivers may be loaded onto the memory 214, and the USB adapter 100 is delivered to the end user.

This may be advantageous for the manufacturer, because only a single USB adapter 100 may be used to interface with a plurality of types and classes of USB devices. Depending on the size of the memory 214 provided in the USB adapter 100, a small or large set of device drivers may be loaded onto the USB adapter 100 prior to delivery to the end user. Thus, the USB adapter 100 may be configured or reconfigured to support any USB client.

In an alternative embodiment, the end user may configure the USB adapter 100 for the desired usage. For example, the user may connect the USB adapter 100 to the LAN 310 and, using the PC 330, may utilize a configuration utility to select the desired configuration for the USB adapter 100. If the desired device drivers are not already loaded onto the memory 214 of the USB adapter 100, the device drivers may be retrieved from a remote source (e.g., server 350), may be retrieved from a hard drive (e.g., PC 330), or may be retrieved from an installation CD in the PC 330.

A multi-use USB adapter 100 in accordance with the present invention may be utilized for a variety of applications. For example, digital cameras 321 are typically provided with USB ports and are configured to attach to a USB host as USB clients. This is conventionally done using a PC as the USB host, with the PC having the necessary USB device drivers stored thereon.

In accordance with embodiments of the present invention, the multi-use USB adapter 100 may be used to connect the digital camera 321 to the LAN 310. The USB adapter 100 may be provided with a set of USB device drivers to use with a plurality of different USB cameras. Alternatively, the control logic 210 may retrieve the device driver corresponding to the digital camera 321 from the server 350. Once the appropriate device driver is retrieved and loaded, the digital camera 321 is enumerated and made available to other devices on the LAN 310. Accordingly, the utilizing device on the network may be the set-top device 332 or the PC 330. These utilizing devices may access the digital camera 321 as a network service, e.g., as a Network Attached Storage (NAS) device, without having the camera device drivers stored thereon.

In accordance with other embodiments, human interface devices, such as a keyboard 322 and/or a mouse 323, may be coupled to the multi-use USB adapter 100. Again, the USB device drivers are stored in the memory 214 of the USB adapter 100, which serves as the USB host, rather than on the utilizing devices (e.g., PC 330 or set-top device 332). This may be useful for providing a keyboard and/or mouse input access to the set-top device 332, which is typically interfaced using a remote control having a limited keypad set.

In accordance with yet other embodiments, a USB modem may be coupled to the multi-use USB adapter 100. Most conventional modems are provided with RJ45 ports for connection with Ethernet cables. In the past, however, some modems have been provided with only a USB port for direct connection with PCs. This was often because the manufacturer assumed that modem would be used with only a single PC, and that the end user's PC would likely be provided with a USB port, but not necessarily with a network adapter or network interface card (NIC). Unfortunately, these USB-enabled modems cannot be easily connected to multiple computers using routers or switches. Therefore, it may be desirable to utilize the USB adapter 100 to provide a connection between the USB modem and a router, which can then provide connection to other devices on the LAN.

In accordance with yet other embodiments, the multi-use USB adapter 100 may be used to connect a USB-enabled printer 324 to the LAN 310. Unlike other USB print servers, the USB adapter 100 is configurable to be used with a plurality of different types or classes of USB devices, and may further be configured to retrieve the necessary device drivers automatically from a remote server 350. Once the USB printer 324 is detected and enumerated, the printer 324 can be made available to other devices on the LAN 310. It may be desirable for the USB adapter 100 to be configured to utilize the Internet Printing Protocol (IPP) to allow users to print from any computer over the LAN 310 or WAN 302 by specifying the device's URL.

In accordance with yet other embodiments, the multi-use USB adapter 100 may be used to connect a dedicated Network Attached Storage (NAS) device 325 to the LAN 310. In some embodiments, the NAS device 325 may be any USB-enabled device capable of storing data. The USB adapter 100 may be provided with or may retrieve driver software to enable other devices in the LAN 310 to access the device 325 as a NAS device 325.

The USB adapter 100 may be implemented in a variety of ways. In some embodiments, the USB adapter comprises an embedded system which is controlled using firmware implemented in hardware devices, e.g., one or more solid state ROM or Flash memory devices. These embedded systems are typically provided with limited hardware resources, as compared with personal computers. For example, the USB adapter may have no disk drive, operating system, keyboard, or display. The USB adapter may have no operating system, or a specialized embedded operating system, such as a real-time operating system.

Embodiments of the present invention may provide various advantages not provided by prior art systems. Rather than merely extending the reach of a host computer, the USB adapter can serve as the USB host for the USB device and make the functions provided by that USB device available to other devices on the network via Ethernet. Thus, the connecting devices on the network need not be provided with the USB driver software specific to that USB device.

While the invention has been described in terms of particular embodiments and illustrative figures, those of ordinary skill in the art will recognize that the invention is not limited to the embodiments or figures described. For example, in many of the embodiments described above, the multi-use adapter is configured to establish a connection with the client device using the USB protocol. In other embodiments, other serial communication protocols may be used.

In addition, in the embodiments described above, the USB adapter 100 is configured to communicate to the network using IP. In other embodiments, the other communication protocols may be used. In addition, other types of physical layer connections to the network are possible. Also, the physical layer connection between the USB client device and the USB adapter and/or the connection between the USB adapter and the LAN need not be limited to the embodiments described herein. For example, in other embodiments, a wireless USB connection may be used.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A data communications network, comprising:
a multi-use adapter configured to provide network connectivity for a serial bus client independent of a separate host system, said adapter comprising:
a serial interface for coupling with the serial bus client;
a network interface for interfacing the adapter with a network; and
host control logic configured to interface a plurality of types of serial bus clients with a utilizing device over the network;
wherein at least one said serial bus client comprises a Universal Serial Bus ("USB") client, said serial interface comprises a USB interface, and said host control logic comprises a USB host configurable to interface with the plurality of types of USB clients; and
wherein said host control logic is configured to automatically detect a USB client coupled to the USB interface, to automatically determine at least one compatible driver for the detected USB client, and to automatically retrieve one or more of the compatible drivers.

2. The network of claim 1, wherein:
said host control logic is reconfigurable to interface with a second plurality of types of USB clients.

3. The network of claim 1, wherein:
said host control logic is configured to interface an input device having a USB interface with the utilizing device over the network.

4. The network of claim 3, wherein:
said host control logic is configured to interface the input device with the utilizing device, said utilizing device comprising a set-top device coupled to the network, said set-top device receiving control inputs from the input device.

5. The network of claim 3, wherein:
said host control logic is configured to interface the input device with the utilizing device, said utilizing device comprising a computer coupled to the network, said computer receiving control inputs from the input device.

6. The network of claim 3, wherein:
said host control logic is configured to interface with an input device comprising a keyboard, mouse, or trackball.

7. The network of claim 3, wherein:
said network interface comprises a wireless network interface.

8. The network of claim 1, wherein:
said host control logic is configured to interface with a utilizing device comprising one of: a computer, a set top device, a personal digital assistant, a camera, a video telephone, and a media adapter.

9. The network of claim 1, further comprising:
the utilizing device coupled to the multi-use adapter over the network, said utilizing device interfacing with the USB client via the multi-use adapter.

10. The network of claim 1, wherein:
the utilizing device comprises a computer coupled to the multi-use adapter over the network; and
the serial bus client comprises a computer peripheral utilized by the computer via the multi-use adapter.

11. The network of claim 1, wherein:
said host control logic is configured to interface the plurality of types of serial bus clients with the utilizing device over the network to enable the utilizing device to utilize the serial bus clients.

12. The network of claim 1, wherein said host control logic is further configured to automatically retrieve the corresponding driver via the network interface.

13. A method of operating a data communications network, comprising:
establishing a serial connection between a serial bus client and a multi-use adapter, wherein said serial bus client comprises a Universal Serial Bus ("USB") client, and said adapter comprises a USB adapter, said USB adapter comprising a USB host configurable to interface with a plurality of classes of USB clients;
establishing a network connection between the adapter and a network independent of a separate host system;
operating the adapter to interface the serial bus client with a utilizing device on the network; and
operating the USB network adapter to automatically determine at least one compatible driver for the USB client, and automatically retrieve at least one of the compatible drivers via the network interface;
wherein said adapter comprises a serial bus host configurable to interface with a plurality of classes of serial bus clients.

14. The method of claim 13, further comprising:
reconfiguring the USB adapter to interface with class of USB client distinct from said plurality of classes of USB clients.

15. The method of claim 13, wherein:
said operating the adapter to interface the serial bus client with the utilizing device comprises interfacing an input device with the utilizing device.

16. The method of claim 15, wherein said utilizing device comprises a set-top device coupled to the network, said method further comprising:
using the USB adapter to transmit control inputs from the input device to the set-top device.

17. The method of claim 15, wherein said utilizing device comprises a computer coupled to the network, said method further comprising:
using the USB adapter to transmit control inputs from the input device to the computer.

18. The method of claim 15, wherein:
said operating the adapter to interface the serial bus client with the utilizing device comprises interfacing a keyboard, mouse, or trackball with the utilizing device.

19. The method of claim 13, wherein:
said coupling the network interface of the USB adapter with the network comprises establishing a wireless connection between the network interface of the USB adapter and the network.

20. The method of claim 13, wherein: said coupling the network interface of the USB adapter with the network comprises coupling an Ethernet cable to the USB adapter.

21. The method of claim 13, wherein:
said operating the adapter to interface the serial bus client with the utilizing device comprises operating the adapter to interface the serial bus client with the utilizing device comprising one of: a computer, a set top device, a personal digital assistant, a camera, a video telephone, and a media adapter.

22. The method of claim 13, wherein the utilizing device comprises a computer coupled to the multi-use adapter over the network, and the serial bus client comprises a computer peripheral utilized by the computer via the multi-use adapter, the method further comprising:
operating the computer to utilize the computer peripheral via the multi-use adapter.

23. The method of claim 13, further comprising:
operating the utilizing device to utilize the serial bus client via the multi-use adapter.

24. A data communications network, comprising:
a multi-use adapter configured to provide network connectivity for a serial bus client independent of a separate host system, said adapter comprising:
a serial interface means for coupling with the serial bus client;
a network interface means for interfacing the adapter with a network; and
control means configured to interface a plurality of types of serial bus clients with a utilizing device over the network;
wherein at least one said serial bus client comprises a Universal Serial Bus ("USB") client, said serial interface means comprises a USB interface, and said control means comprises a USB host configurable to interface with the plurality of types of USB clients; and
wherein said control means is configured to automatically detect a USB client coupled to the USB interface, to automatically determine at least one compatible driver for the detected USB client, and to automatically retrieve one or more of the compatible drivers.

* * * * *